United States Patent Office 3,347,290
Patented Oct. 17, 1967

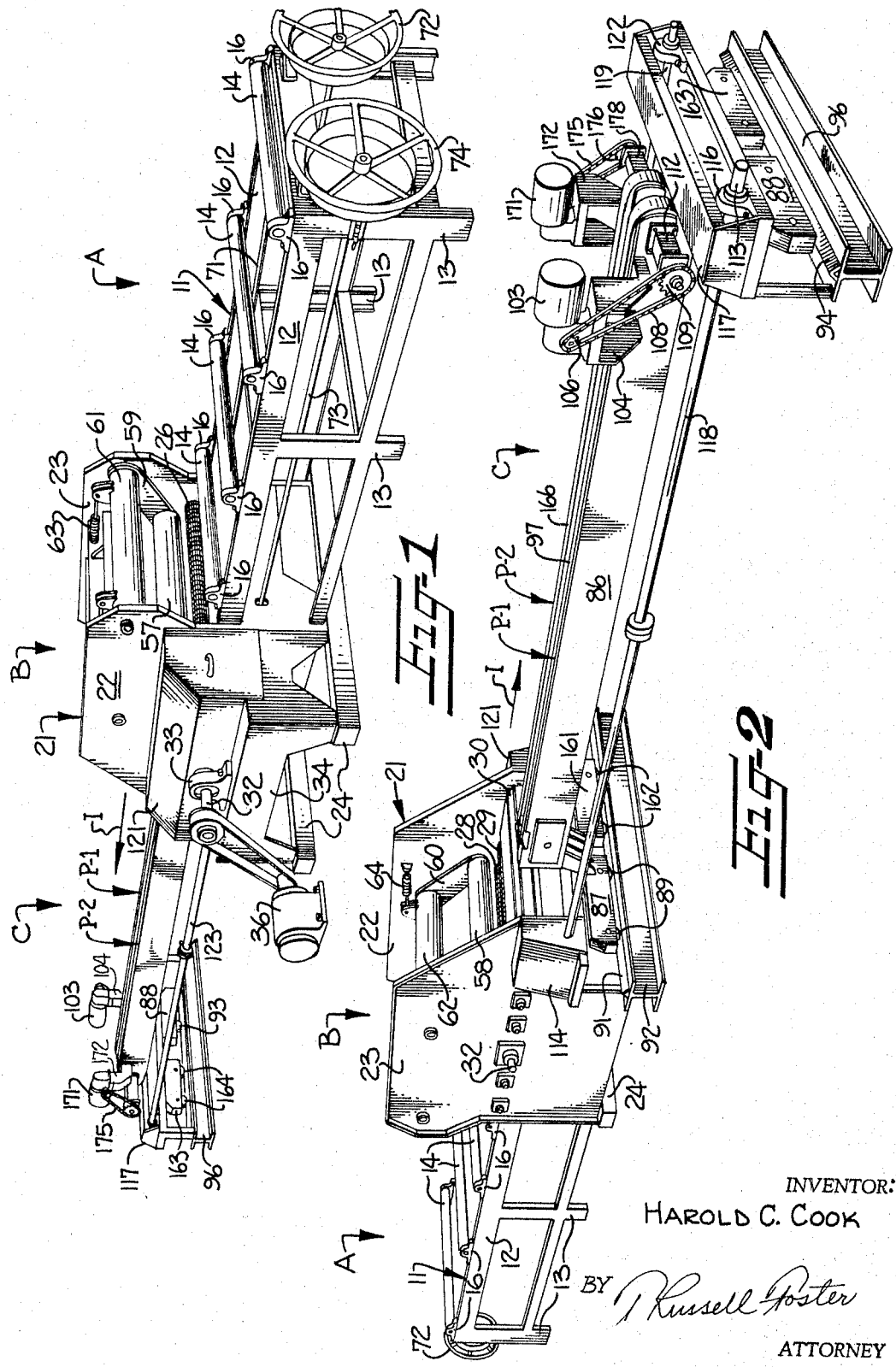

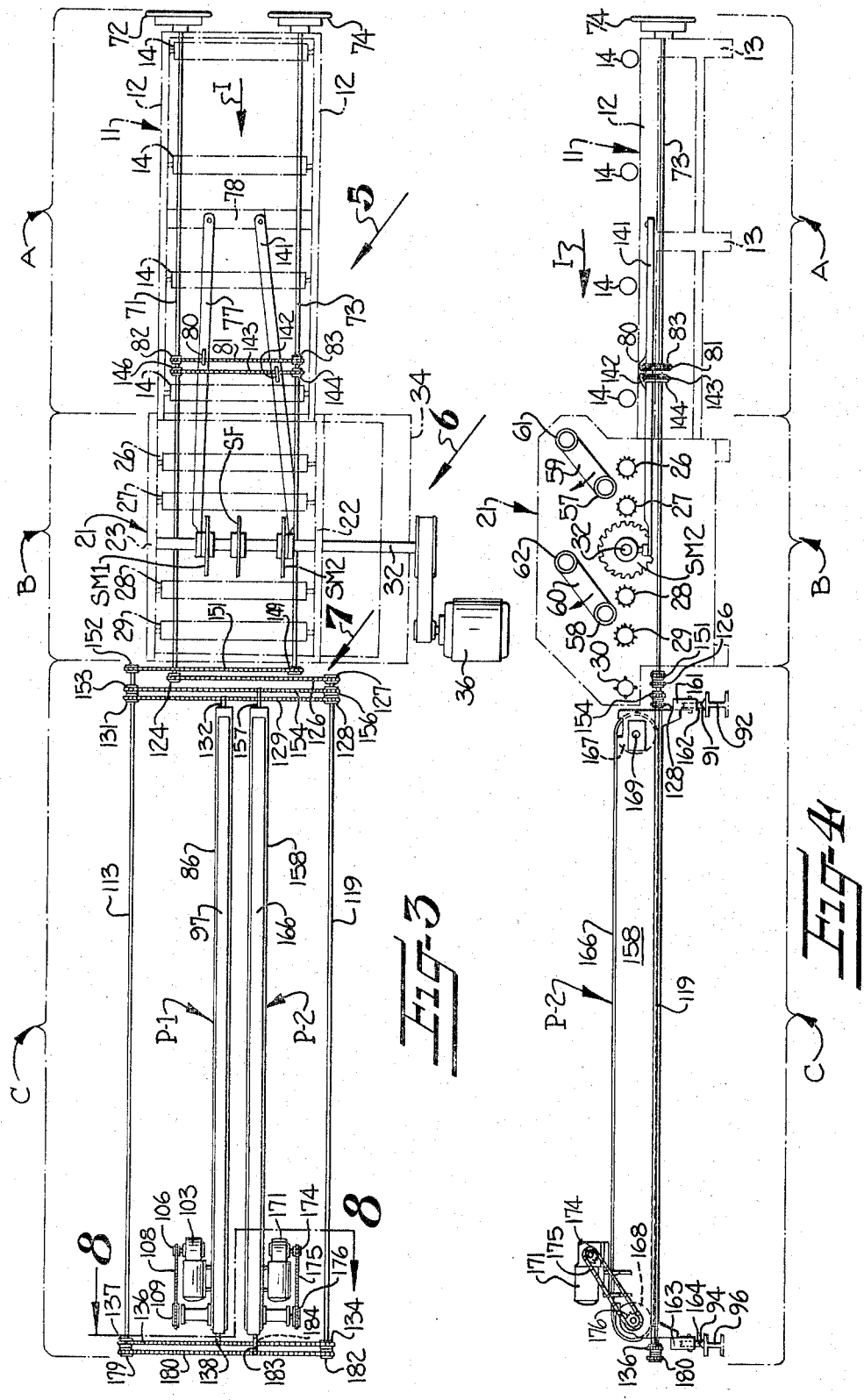

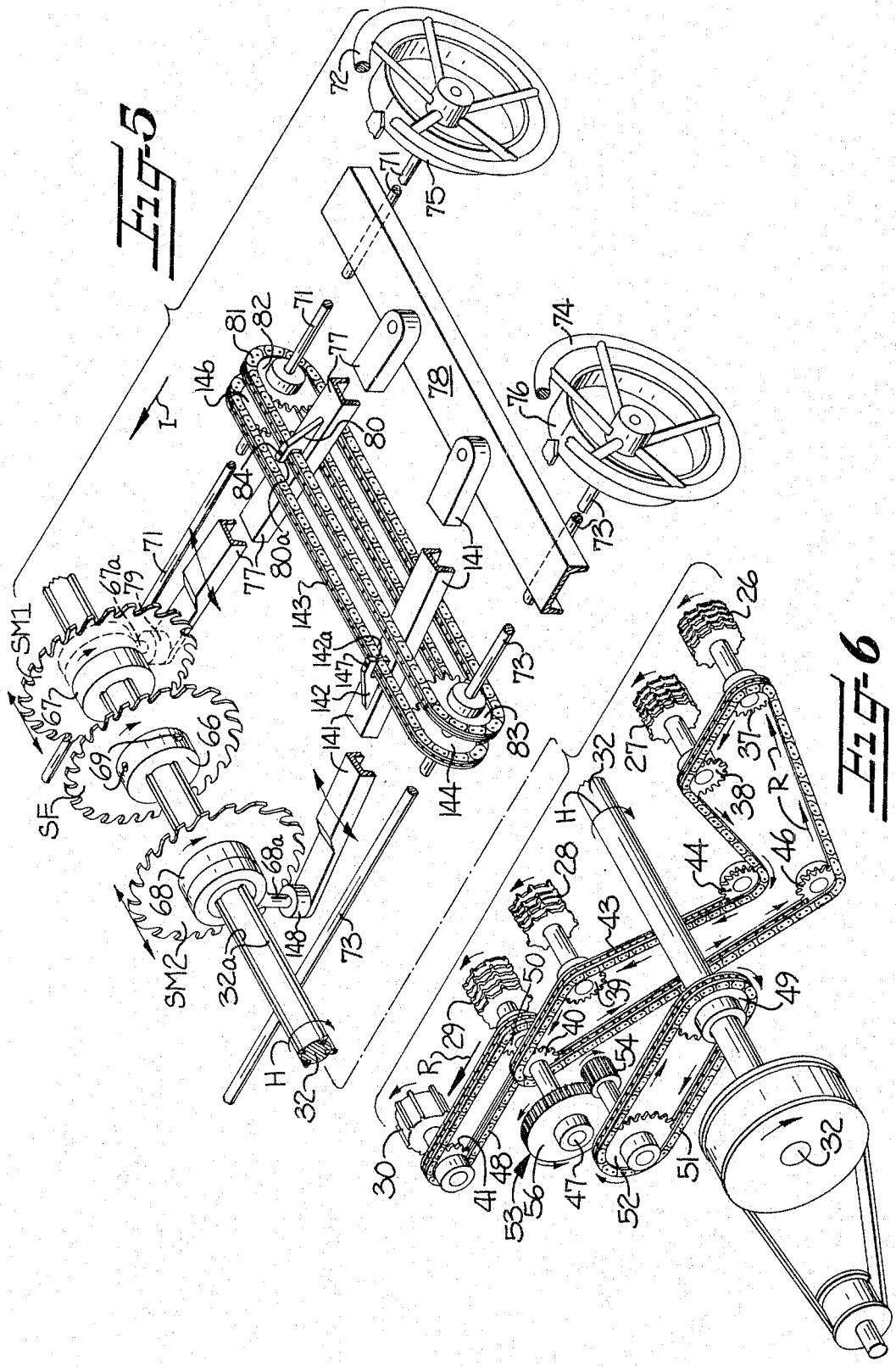

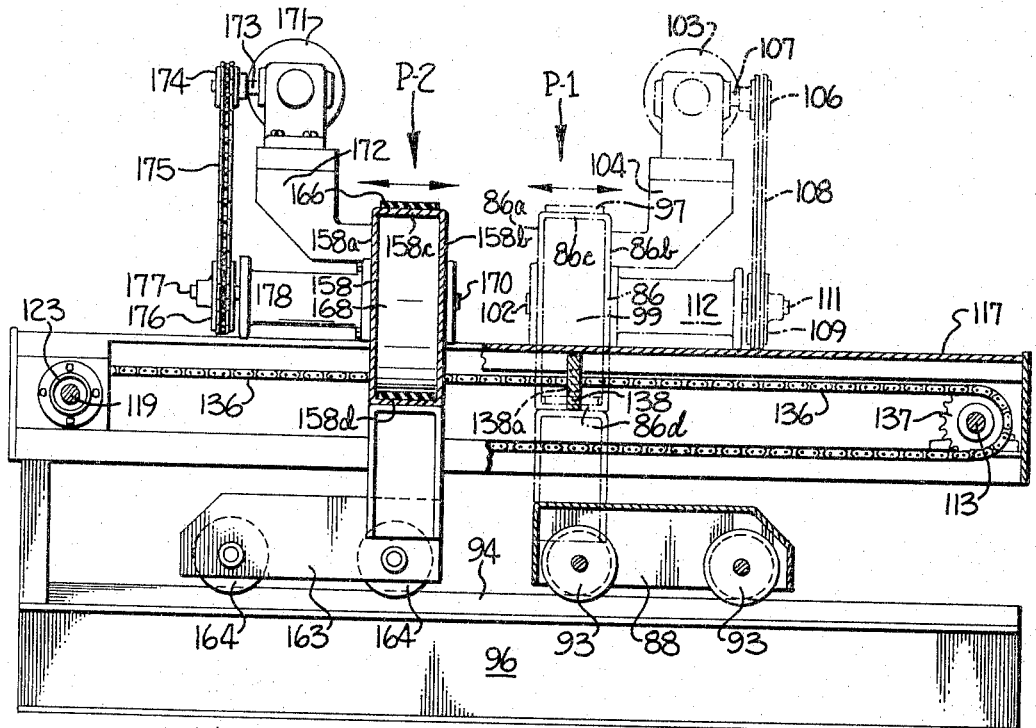
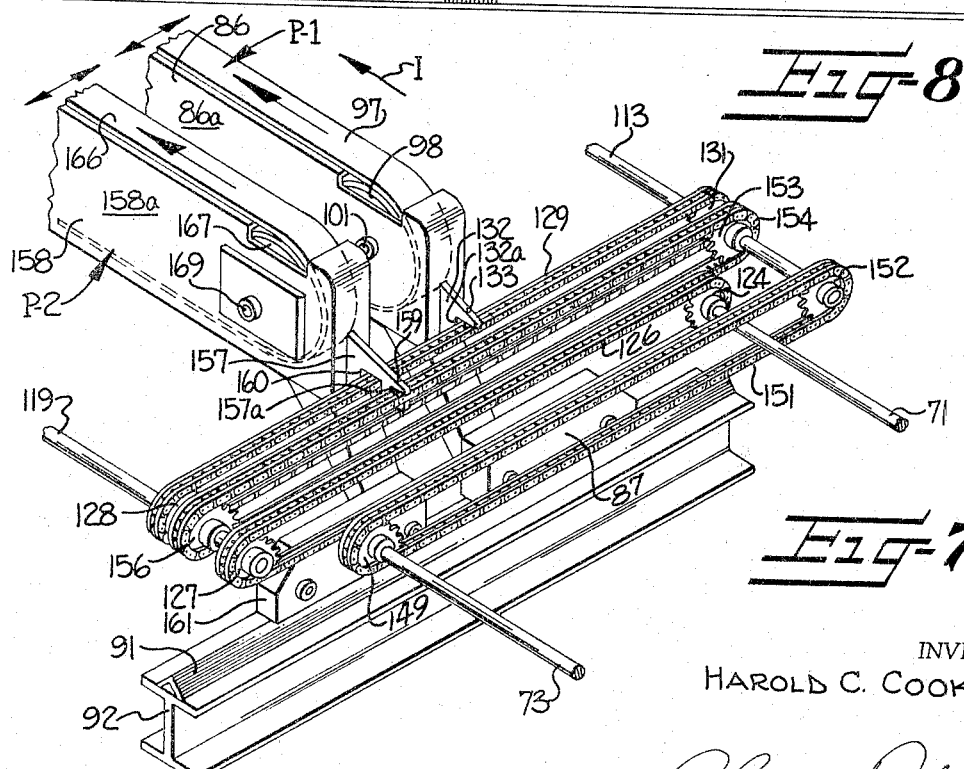

3,347,290
EDGER PICKER
Harold C. Cook, P.O. Drawer 688,
Clinton, N.C. 28328
Filed Apr. 27, 1965, Ser. No. 451,182
4 Claims. (Cl. 143—37)

ABSTRACT OF THE DISCLOSURE

The edger picker of the invention includes a frame on which is supported board conveying means, and rotatably mounted fixed and movable saws connected to suitable saw rotating means. The movable saw is movable laterally with respect to the frame for edging a board of a predetermined width. Also supported on the frame is a rotatable control rod having a pair of drive sprockets which is rotated by suitable rotating means. A pivotally mounted control arm on the frame is connected to the movable saw. Chain means are provided for drivably connecting one of the sprockets to the control rod and for drivably connecting the other sprocket to a laterally movable picker frame having suitably driven board conveying means. The picker frame is centrally positioned relative to the fixed and movable saws and rotation of the control rod shifts the picker frame simultaneously with the movable saw maintaining the picker frame in its central position for edging a board to a selected width.

---

This invention relates to saw mill apparatus and more particularly to an edger picker apparatus for edging rough lumber cut from a log.

In one well known saw mill operation, the rough lumber or boards cut from a log contain bark and wood of uneven configuration along their side edges which must be removed to produce a finished board. Apparatus generally referred to as an "edger picker" is commonly employed to remove these rough edges from the boards in what is referred to as an "edging" operation. Such an "edger picker" utilizes literally spaced edging saws which simultaneously trim both edges of the rough board producing wane or "edgings" which are disposed of. The edged or finished board is conveyed away from the saws by the picker portion of the edger picker.

It can be understood that in sawing a log into rough lumber, boards of various widths are obtained so that the edging saws must be repeatedly adjusted for the proper width of the board being edged. It is a common practice therefore to provide for adjusting the spacing of the saws for the edging of boards of varying widths as well as to provide a fixed saw and a movable saw for easily accomplishing this variation in saw spacing. However, many difficulties are encountered in such an edging operation carried out in apparatus of this general type. As is well known, the "edgings" or strips produced each time a board is edged must be separated from the finished board and disposed of separately without interfering with the edging operation. Many devices have been suggested for disposing of these strips such as deflectors. It can be understood that with the wide variation in the spacing of the saws in production, such present day devices for separating the finished board from the edgings have not been able to function efficiently in accommodating the wide range of finished board widths. Furthermore, as such devices for separating the edgings from the finished board are usually incorporated in the picker portion of the edger picker, further difficulties arise with present day constructions from the dual function of having to separate edgings from the finished board and convey the finished board considering the wide range board widths generally encountered.

In addition, for reasons of efficiency and versatility, it is highly desirable that an edger picker not only perform an edging and picking operation on a board but also that it be suitable for performing both an edging operation and a ripping operation on a board followed by the picking operation. Consequently, a common practice in present day construction of edger pickers is to provide three saws in the edger portions of the edger picker, two of which saws being used to edge the rough board and the third for ripping the rough board centrally into two finished boards as it is being edged. It can readily be seen that the problems described above relative to the picking operation for separating the edgings and conveying the finished board subsequent to a simple edging operation are considerably increased in the three saw edging and ripping operation. In addition to the difficulty of adjusting the position of the three saws for each board width processed, not only must the edgings be efficiently separated from the finished boards but the two finished boards must each be conveyed independently by the picker regardless of the position of the saws which are repeatedly being shifted for various board widths. These problems are even further magnified by the high production speeds required for an economical saw mill operation under present day conditions and the need for versatility in such edger pickers which must shift readily between an edging operation and an edging and ripping operation while accommodating repeatedly changing widths of rough boards.

Accordingly, a primary object of this invention is to provide a new and novel edger picker for processing rough boards.

Another object of this invention is to provide a new and novel edger picker for edging rough boards throughout a wide range of board widths and which efficiently and automatically separates the edgings and transports the finished boards to a desired location.

A further object of this invention is to provide a new and novel edger picker which may be used selectively for either an edging or edging and ripping operation on boards throughout a wide range of widths and which efficiently and rapidly transports the finished board or boards to a desired location without the edgings.

Still another object of this invention is to provide a new and edger picker for processing rough boards throughout a wide range of widths in either an edging or an edging and ripping operation in which the pickers are automatically centered relative to the edger saws for balancing and conveying the finished board or boards for any width of board processed.

This invention further contemplates the provision of a new and novel edger picker which is simple and inexpensive in construction, which is quickly and easily adjustable for edging or edging and ripping rough boards of any width throughout a wide range, which permits gravity separation of the edgings from the finished board or boards being conveyed to a desired location and which provides a dual board edging arrangement each independently adjustable for edging boards of varying widths.

Other objects and advantages of the invention will become apparent from the following description taken in connection with the accompanying drawings.

The objects stated above and other related objects in this invention are accomplished by providing a frame having means for conveying rough boards cut from a log in a path of travel. A fixed saw and a movable saw are rotatably mounted on the frame and means are provided for rotating both of the saws and for shifting the movable saw laterally of the frame to a selected position in laterally spaced relationship with the fixed saw. A picker which includes conveying means extending in the direction of the path of travel is supported for movement laterally of the frame and is centrally positioned relative to the fixed and movable saws for balancing and conveying edged boards from the saws in the path of travel. Means are provided for shifting the picker simultaneously with the shifting of movable saw to maintain the picker in its central position relative to the saws in any selected position of the movable saw thereby permitting edging of boards of varying widths and gravity separation of the edgings from the edged board balanced and conveyed in the path of travel by the picker. In one embodiment of the invention, a pair of movable saws are mounted on opposite sides of the fixed saw for rotation and for independent movement laterally of the frame relative to the fixed saw for either two saw edging or three saw edging and ripping of rough boards conveyed in the path of travel. A pair of pickers are also provided each positioned centrally relative to the fixed saw and a movable saw. Each picker is arranged to be moved laterally of the frame automatically with its associated movable saw while being maintained in its central position relative to its associated saws in any selected position of its associated movable saw.

The novel features which are believed to be characteristic of the invention are set forth with particularity in the appended claims. The invention itself, however, both as to its organization and method of operation may be best understood by reference to the following description taken in conjunction with the accompanying drawings in which:

FIGURE 1 is a perspective view of the edger picker of the invention as viewed from its infeed end;

FIGURE 2 is a perspective view of the edger picker of the invention as viewed from its delivery end;

FIGURE 3 is a plan view of the edger picker of the invention;

FIGURE 4 is an elevation view of the edger picker of the invention;

FIGURE 5 is an isometric view partially broken away of a portion of the edger picker of the invention taken substantially in the direction of the arrow 5 of FIGURE 3;

FIGURE 6 is an isometric view of a portion of the edger picker of the invention taken substantially in the direction of the arrow 6 of FIGURE 3;

FIGURE 7 is an isometric view of a portion of the edger picker of the invention taken substantially in the direction of the arrow 7 of FIGURE 3; and FIGURE 8 is a sectional view of the invention taken substantially along line 8—8 of FIGURE 3 in the direction of the arrows.

Referring now to the drawings and to the FIGURES 1–4 in particular, there is shown an edger picker constructed in accordance with the invention which is adapted to remove the bark and uneven edge portions from rough boards cut from a log in what is generally referred to as an "edging" operation. The edger picker of the invention also separates the severed strips or "edgings" from the finished board with the use of "pickers" incorporated as an integral part of the edger picker. The edger picker of the invention may be used to perform an edging operation on a rough board to produce a single finished board and, for clarity, the description of the edger picker will be directed initially to that portion of the invention by means of which a single finished board is produced. However, the edger picker of the invention is equally suitable for performing both an edging and ripping operation on a rough board so as to produce two finished boards and the latter part of the description will be directed to this feature.

The edger picker of the invention comprises three sections, an infeed section A, an edger section B, and a picker section C. The rough board to be processed in the edger picker is advanced successively through sections A, B, and C in a path of travel designated generally by the arrow I in FIGURE 3. Referring now to FIGURE 3, the infeed section A comprises a table 11 having side members 12 supported on legs 13 having a length for supporting the table 11 at a suitable height relative to the edger section B.

In order to convey a board in the path of travel I, means are provided on the feed table 11 which include a plurality of freely rotatable rollers 14 arranged in spaced parallel relationship transversely of the table 11. As shown best in FIGURE 1, the rollers 14 are supported at their ends in bearing pedestals 16 secured in any suitable manner to the upper edge of the table side members 12.

The edger section B includes a frame designated generally by the numeral 21 having side walls 22, 23 suitably supported on base members 24. In order to convey a board through the edger section B in the path of travel I, a plurality of feed rolls 26–30 are provided which are arranged in substantially parallel spaced relationship within the edger section frame 21 as shown best in FIGURES 3, 4. The feed rolls 26–30 are preferably fluted on their peripheries as shown and are journaled for rotation at each end within suitable bearings supported in the side walls 22, 23 of the edger section frame 21.

Means are provided for driving the feed rolls 26–30 which include a drive shaft 32 which is rotatably supported in suitable bearings in side walls 22, 23 of frame 21 and in bearing pedestal 33 supported as shown in FIGURE 1 on an extension 34 of the edger frame 21. As will be explained hereinafter, the drive shaft 32 also serves as an arbor for supporting and rotating the saws of the edger section B and is connected at one end to drive means such as drive motor 36 as shown best in FIGURES 1, 3.

Referring now to FIGURE 6, in order to rotate the feed rolls 26–30, the feed rolls are provided with drive sprockets 37–41 respectively fixed thereto at one end. Drive sprockets 37–40 are interconnected for simultaneous rotation by means of a chain 43 which also extends around idler sprockets 44, 46 as shown. Sprockets 41 on feed roll 30 is also connected for simultaneous rotation with sprockets 37–40 to a sprocket 50 on shaft 47 of feed roll 29 by means of a chain 48.

In order to drive chains 43, 48, a take-off sprocket 49 is secured to the drive shaft 32 which is connected by means of chain 51 to a suitable supported sprocket 52. Sprocket 52 is connected in turn to a suitably supported speed reducer 53 containing suitable spaced reducing means such as internal meshing gears 54, 56, the latter of which is connected directly to an extension of the shaft 47 of feed roll 29. The motor 36 is thus arranged to rotate the drive shaft 32 in the direction of the arrow H so that through the previously described connection between sprockets 49, 47, the chains 43, 48 are advanced in the direction of the arrows R and the feed rolls 26–30 are rotated in a direction opposite to that of the shaft 32.

Means are also provided in the edger section B for urging a board advancing through the edger section against the feed rolls 26–30. More specifically, pressure rollers 57, 58 are each connected by means of a pair of arms 59, 60 pivotally mounted rollers 61, 62 respectively suitably supported on the side walls 22, 23 of edger frame 21 as shown best in FIGURES 1, 4. The pressure rollers 57, 58 are thus arranged to pivot freely as shown by the double arrows of FIGURE 4 and are gravity loaded by their own weight against a board advancing through edger section B. The rollers 57, 58 thus yieldingly urge an advancing board against feed rolls 26–30 for proper feeding of the board and any tendency of the rollers 57, 58 to bounce is dampened by suitable means such as damping springs 63, 64 connected to rollers 61, 62 and suitable members of the edger frame 21 as shown best in FIGURES 1, 2.

In order to edge or edge and rip the board advancing through edger section B, saws are provided on the drive shaft or arbor 32 which include a fixed saw SF and movable saws SM1, SM2 mounted on opposite sides of the fixed saw SF in laterally spaced relationship therewith. As shown best in FIGURE 5, the saws SF, SM1, SM2 are provided with internally slotted hubs 66–68 respectively which are fitted onto the shaft 32 and secured thereto by means of keys 32a for high speed rotation therewith. The saw hub 66 and consequently the saw SF is fixed to the shaft 32 by means such as set screws 69. In addition to rotating with the shaft 32, each of the movable saws SM1, SM2 may be shifted laterally of the edger frame 21 in either direction as indicated by the double arrows of FIGURE 5 relative to the fixed saw SF as permitted by the spline connection between the saw hubs 67, 68 and the shaft 32.

Means are provided for shifting each of the movable saws SM1, SM2 laterally of the edger frame 21 to a selected position in laterally spaced relationship with the fixed saw SF in accordance with the width of the board to be edged in the edger section B. More specifically, movable saw SM1 has associated therewith a control rod 71 extending in the direction of the arrow I through the infeed section A and edger section B along the right hand side of the edger picker of the invention as viewed in FIGURE 1. The control rod 71 is suitably mounted for rotation in sections A, B and is arranged to be rotated by suitable means such as a manual shift wheel 72 suitably secured thereto at one end as shown in FIGURES 3, 5. Similarly, saw SM2 has associated therewith a control rod 73 extending along the left hand side of the edger picker as viewed in FIGURE 1 which is arranged to be rotated by means of a manual shift wheel 74. Preferably, shift wheels 72, 74 are provided with indexing means 75, 76 respectively as seen best in FIGURE 5.

In order to connect the control rod 71 with movable saw SM1, a control arm 77 is pivotally mounted at one end on a cross member 78 suitably supported on the side members 12 of the infeed table 11. The other end of the control arm 77 is provided with a socket member 79 which is arranged to receive a downwardly extending lug 67a on the hub 67 of movable saw SM1. The control arm 77 is also provided with an upstanding bracket 80 having an end notch 80a. The bracket notch 80a is arranged to receive a continuous chain 81 extending transversely of the infeed section A around a drive sprocket 82 suitably fixed to the control rod 71 and an idler sprocket 83 supported for free rotation on control rod 73. Suitable means such as a pin 84 is arranged to retain the chain 81 in the notch 80a of racket 80 so that rotation of the shift wheel 72 pivots the control arm 77 through the control rod 71 and chain 81 so as to shift the movable saw SM1 on the drive shaft 32 in either direction relative to the fixed saw SF as indicated by the double arrows of FIGURE 5.

The picker section C includes a pair of pickers P1, P2 arranged in spaced parallel relationship for movement transversely of the edger picker as will be explained hereinafter. As is well known, pickers P1, P2 are employed to support and convey an edged board in the direction of the path of travel I from the edger section B to a suitable location. Picker P1 which is associated with saws SF, SM1 includes a frame 86 extending in the direction of the path of travel I. As shown in FIGURE 3, the picker frame 86 is supported in a central position relative to the fixed saw SF and movable saw SM1 and is arranged for movement laterally of the frame 21 of edger section B.

More specifically, the ends of the picker frame 86 are mounted on carriages 87, 88 as shown in FIGURES 2, 7. The carriage 87 at the end of the picker frame 86 adjacent the edger frame 21 is provided with a pair of spaced rotatably mounted, grooved wheels 89 engageable with a track 91 supported on a base member 92 extending laterally of the picker section C. Similarly, the carriage 88 suitably secured to the other end or delivery end of the picker frame 86 has a pair of rotatably mounted spaced wheels 93 engageable with a track 94 supported on a base member 96 extending laterally of the picker section C. With this arrangement, the carriages 87, 88 may be moved simultaneously along tracks 91, 94 respectively together with the picker frame 86 in either direction laterally of the picker section C as shown by the double arrows of FIGURES 7, 8.

As shown in FIGURES 7, 8, board conveying means are provided on picker P1 which include a belt 97 which extends around rollers 98, 99 rotatably supported by suitable means such as shafts 101, 102 at opposite ends of the picker frame 86. The picker frame 86 is preferably rectangular in cross section having side walls 86a, 86b, top wall 86c, and bottom wall 86d so that belt 97 advances over top and bottom walls 86a, 86d between the side walls 86a, 86b, as shown best in FIGURE 8.

Means are provided for advancing the conveyor belt 97 of picker P1 in the direction of the arrow of FIGURE 7 which include a drive motor 103 supported on the picker frame 86 by means of a bracket 104 for movement therewith. A drive sprocket 106 mounted on the shaft 107 of motor 103 is connected by means of chain 108 to sprocket 109 mounted on shaft 111 rotatably journaled in a housing 112. The shaft 111 is suitably connected to the shaft 102 of roller 99 around which conveyor belt 97 extends at the delivery end of picker P1.

Means are provided for shifting picker P1 simultaneously with the shifting of the movable saw SM1 to maintain the picker P1 in its central position relative to the fixed saw SF and movable saw SM1 in any selected position of saw SM1. More specifically, a jack shaft 113 is suitably supported in parallel relationship with the picker P1 along the right hand side of picker section C as viewed in FIGURE 3. Preferably the jack shaft 113 is supported at one end in a bearing housing 114 mounted on the edger frame 21 and bearing pedestal 116 positioned on a frame 117 suitably supported on the base member 96. Preferably the jack shaft 113 is enclosed within a tubular housing 118 which provides both support and protection for the shaft 113.

Similarly, picker P2 has associated therewith a jack shaft 119 supported in parallel relationship therewith on the opposite side of the picker section C from shaft 113 as shown best in FIGURE 3. The jack shaft 119 is supported at its ends in bearing housing 121 and bearing pedestal 122 positioned on frame 117 and the jack shaft 119 is preferably enclosed within a tubular housing 123 similar to housing 118 for jack shaft 113.

In order to shift the picker P1 simultaneously with the shifting of the movable saw SM1, a drive sprocket 124 is suitably secured to the end of the control rod 71 adjacent the edger section B as seen best in FIGURE 7. The sprocket 124 is connected by means of a continuous chain 126 to a drive sprocket 127 suitably secured to the jack shaft 119. Drive sprocket 128 is also suitably secured to the jack shaft 119 in spaced relationship with the drive sprocket 127 and a continuous chain 129 extends around drive sprocket 128 and an idler sprocket 131 rotatably supported on the jack shaft 113. As shown best in FIGURE 7, the chain 129 extends through a notch 132a on a bracket 132 secured to the end of the picker frame 86 adjacent the edger section B. The chain 129 is preferably secured to the bracket 132 within the notch 132a by means of a pin 133.

In order to move both ends of the picker P1 simultaneously, a drive sprocket 134 is mounted on the other end of the jack shaft 119. As shown in FIGURES 3, 8, a continuous chain 136 is provided which extends around the drive sprocket 134 and an idler sprocket 137 rotatably mounted on the corresponding end of the jack shaft 113. The delivery end of the frame 86 of picker P1 is provided with a bracket 138 containing a notch 138a through which the chain 136 extends. The chain 136 is secured to bracket 138 within the notch 138a by means such as a pin in the manner previously described with reference to the other end of picker P1.

As has been previously referred to, component parts are provided in the edger picker of the invention for moving the movable saw SM2 and picker P2 simultaneously similar to those parts employed for the movement of saw SM1 and picker P1. More specifically, the edger section B and infeed section A are provided with a control arm 141 pivotally secured at one end to cross member 78 as shown in FIGURE 5. Upstanding bracket 142 is suitably positioned on control arm 141 and is provided with an end notch 142a. Chain 143 is provided which extends around a drive sprocket 144 suitably secured to the control rod 73 and an idler sprocket 146 rotatably mounted on control rod 71. A pin 147 connects the control arm bracket 142 to the chain 143 within the notch 142a.

The other end of the control arm 141 is provided with an upstanding socket 148 for receiving a lug 68a on the hub 68 of movable saw SM2. Thus, pivotal movement of the control arm 141 shifts the movable saw SM2 in either direction laterally of the fixed saw SF to any selected position as indicated by the double arrow of FIGURE 5.

In order to shift the picker P2 simultaneously with the shifting of movable saw SM2, a drive sprocket 149 is secured to the end of the control rod 73 opposite the shift wheel 74 as shown best in FIGURE 7. A continuous drive chain 151 extends around drive sprocket 149 and an idler sprocket 152 rotatably mounted on jack shaft 113. A drive sprocket 153 is also suitably secured to the jack shaft 113 adjacent the drive sprocket 152 and a continuous chain 154 extends around the drive sprocket 153 and an idler sprocket 156 rotatably supported on the jack shaft 119.

As shown in FIGURE 7, the chain 154 extends through an end notch 157a on a bracket 157 suitably secured to the end of frame 158 of picker P2 and chain 154 is connected to bracket 157 by means of pin 159 in a manner similar to the connection between chain 129 and bracket 132 on frame 86 of picker P1. Bracket 157 is also provided with an opening 160 through which chain 129 is permitted to move without interference.

Picker P2 which is similar in construction to picker P1 is centrally positioned relative to the fixed saw SF and movable saw SM2 and is arranged in spaced parallel relationship with picker P1 for movement laterally of the picker section C in the direction of the double arrows of FIGURES 7, 8. More specifically, the end of picker P2 adjacent the edger section B is mounted on a carriage 161 provided with a pair of rotatably mounted, spaced grooved rollers 162 which move along track 91 supported on base member 92 in the manner of carriage 87 as shown in FIGURE 2. The other end of picker P2 is similarly supported on a carriage 163 provided with a pair of rotatably mounted, spaced rollers 164 which move along track 94 supported on base member 96 in the manner of carriage 88 as shown in FIGURE 8.

Board conveying means or belt 166 is provided on picker frame 168 which extends around rollers 167, 168 suitably supported for rotation on shafts 169, 170 at opposite ends of the frame 158 in the manner of picker P1. Similarly, picker frame 158 is substantially rectangular in cross section having side walls 158a, 158b, top wall 158c and bottom wall 158d so that belt 166 advances over top and bottom walls 158c, 158d between side walls 158a, 158b as shown best in FIGURE 8.

As in the manner of conveyor belt 97 on picker P1, means are provided for advancing conveyor belt 166 of picker P2 in the direction of the arrow of FIGURE 7. More specifically, a drive motor 171 is supported by means of a bracket 172 on frame 158 of picker P2 as shown in FIGURES 2, 3, 8. Drive shaft 173 of motor 171 has a drive sprocket 174 suitably mounted thereon which is connected by means of a drive chain 175 to a sprocket 176 mounted on a shaft 177 rotatably journaled in a housing 178. The shaft 177 is suitably connected to the shaft 170 of roller 168 around which belt 166 extends at the delivery end of picker P2.

In order to shift both ends of picker P2 together in the manner of picker P1, a drive sprocket 179 is suitably secured to the jack shaft 113 as shown in FIGURE 3. A continuous drive chain 180 is provided which extends around drive sprocket 179 and an idler sprocket 182 rotatably mounted on the jack shaft 119. The chain 180 is suitably connected by means of a notch and pin connection as previously described with reference to bracket 157 on the other end of picker P2 to a bracket 183 fixed to the delivery end of the frame 158. Similarly, an opening 184 is provided in bracket 183 through which the drive chain 136 is permitted to move without interference.

When the edger picker of the invention is to be operated, the motors 103, 171 of pickers P1, P2 are energized so as to advance the picker conveyor belts 97, 166 respectively in the direction of the arrows of FIGURE 7. The main drive motor 36 is also energized to rotate the main drive shaft 32 together with the fixed saw SF and movable saws SM1, SM2 mounted thereon in the direction of the arrow H of FIGURE 6.

At the same time, by means of the previously described arrangement shown in FIGURE 6, the chains 43, 48 connected to the drive shaft 32 rotate the feed rolls 26–30 in the opposite direction from arrow H as shown by the arrows in FIGURE 6.

When it is an edging operation only to be performed on a piece of rough lumber, the fixed saw SF and either of the movable saws SM1 or SM2 are selected for this edging operation. For instance, when a rough board of a particular width is to be edged, the movable saw SM1 is moved laterally into a selected spaced relationship with the fixed saw SF which spacing corresponds to the width of the resulting finished or edged board.

The selected spacing between the saws is obtained by rotating the hand wheel 72 in the desired direction, either clockwise or counter clockwise, utilizing the indexing band 75 if desired. Rotation of the hand wheel 72 rotates the control rod 71 together with drive sprocket 82 thereby advancing chain 81 and pivoting control arm 77 in the desired direction. By means of the connection between the forward end of the control arm 77 and saw hub 67 comprising the socket member 79 and lug 67a, movement of the saw SM1 laterally of the edger frame 21 in either direction is obtained.

By way of example, a clockwise rotation of the hand wheel 72 and control rod 71 pivots the control arm 77 to the right as viewed in FIGURE 1 increasing the spacing between the fixed saw SF and the movable saw SM1.

As previously discussed, picker P1 is arranged in a central position between the fixed saw SF and the movable saw SM1. Rotation of the control rod 71 to adjust the position of the movable saw SM1 also produces a rotation of sprocket 124 mounted on the end of rod 71. Rotation of sprocket 124 advances chain 126 to rotate sprockets 127, 128 and 134 on jack shaft 119 to simultaneously move picker P1 laterally of the edger frame 21 on its end carriages 87, 88 by means of chains 129, 136 attached as previously described to the ends of the frame 86 of picker P1.

As can be understood, the arrangement of the various component parts of the edger picker of the invention including the sprocket sizes are selected so as to produce a different rate of movement between movable saw SM1 and picker P1 whereby the central position of picker P1 relative to the fixed saw SF and movable saw SM1 is always maintained.

A decrease in the spacing between the fixed saw SF and movable saw SM-1 is produced by an opposite or counter clockwise movement of the hand wheel 72 and control rod 71 to move the chain 81, control arm 77 and movable saw SM1 to the left as viewed in FIGURE 1. At the same time, a simultaneous movement of the picker P1 takes place in the same direction and as previously described at a different rate so that the central position of the picker P1 relative to the fixed saw SF and movable saw SM1 is always maintained in any selected position of the movable saw SM1 regardless of direction of movement.

Similarly, the spacing between the fixed saw SF and movable saw SM2 may be selected by rotating the hand wheel 74 in either direction (clockwise or counter clockwise) together with the control rod 73 using the indexing means 76 if desired. The control arm 141 is thereby moved in the selected direction either to the right or left as viewed in FIGURE 1 by means of the sprocket 144 and chain 143 connected thereto. With the connection between the saw hub 68 formed by the sprocket 148 and lug 68a, the movable saw SM2 is moved in the selected spaced relationship with the fixed saw SF in accordance with the width of the edged board to be produced.

Simultaneous movement of the picker P2 which also is centrally positioned relative to the fixed saw SF and movable saw SM2 is also obtained in the same direction of saw movement by movement of the sprocket 149 on control rod 73 and chain 151. As chain 151 is connected to drive sprocket 152 on jack shaft 113, sprockets 179 also mounted on jack shaft 113 produce the desired movement of the picker P2 laterally of the edger frame 21 by means of chains 154, 180 at a different rate from that of the movable saw SM2 so as to always maintain picker P2 in its central position relative to the fixed saw SF and movable saw SM2.

In performing an edging operation on a board, the versatility of the edger picker of the invention is fully utilized by setting one of the movable saws at a spacing from the fixed saw SF which is different from that of the other movable saw as shown in FIGURE 3. Thus, the saws of the edger section B are arranged to accommodate two board widths selectively either of which may be used in accordance with the width of the board to be edged and minimizing the need for shifting of the saws. However, it should be understood that if boards of greater or lesser widths are to be edged, the position of the movable saws SM1, SM2 may be easily changed by means of the hand wheels 72, 74.

The board to be edged is placed on the infeed rollers 14 of table 11 of infeed section A and moved forward to a selected pair of saws such as the fixed saw SF and movable saw SM1. The board is guided by the operator and advanced in the direction of the arrow I onto the feed rollers 26, 27 and retained thereon by means of the pressure roller 57. The board is subsequently moved into the saws SF, SM1 and the rough edges of the board are removed forming edgings with the finished board therebetween. During this edging operation, the board continues to move in the direction of the arrow I over the feed rolls 28-30 beneath the pressure roller 58 and emerges from the edger section B into the picker section C.

When the edged board and edgings emerge from the edger section B into the picker section C, the finished board is deposited on the conveyor belt 97 of picker P1 which advances the finished board towards the delivery end of the edger picker. As the picker P1 is centrally positioned relative to the saws SF, SM1 used in the edging operation, the conveyor belt 97 contacts the underside of the finished board centrally between its side edges so that it is balanced on the picker P1 as it is conveyed in the direction of the path of travel I. At the same time, the relatively narrow width of the picker P1 permits the edgings to fall downward by gravity on opposite sides of the picker to be disposed of by suitable means (not shown).

Maintaining the picker P1 centrally relative to the associated edging saws SF, SM1 permits the finished board to be properly balanced and conveyed regardless of its width and the relatively narrow width of the picker P1 permits the edgings to fall downwardly by gravity without interference by the frame 86 of the picker regardless of the width of the board edged. The edging operation previously described similarly applies when the fixed saw SF and the movable saw SM2 are employed as all of the parts associated with picker P2 and movable saw SM2 function identically to the manner in which the parts associated with picker P1 and movable saw SM1 function.

When the edger picker of the invention is to be used for both an edging and a ripping operation, the movable saws SM1, SM2 are employed for the edging operation and are moved into the proper spaced relationship by adjustment of the hand wheels 72, 74. As can be understood, not only must the movable saws SM1, SM2 be adjusted relative to each other for the width of the board to be edged, but they must both be adjusted relative to the fixed saw SF so that the fixed saw SF rips the rough board into two finished boards each having the desired width simultaneously with the edging operation by the saws SM1, SM2.

After the proper saw adjustment has been made, the board to be edged and ripped is moved as previously described in the direction of the arrow I onto infeed section A and into edger section B into engagement with the three saws SF, SM1, SM2. As the board moves through the saws, it is edged by the movable saws SM1, SM2 and cut by saw SF into two finished boards each of which is deposited on its associated picker P1, P2. The edgings fall downwardly as previously described on outboard sides of pickers P1, P2. As the pickers are each maintained in a central position relative to its associated fixed saw and movable saw, each of the two finished boards is balanced on its associated picker and properly conveyed to the delivery end of the edger picker.

It can be seen that there has been provided with the novel construction of the invention an edger picker which is highly versatile in operation and which requires only a minimum of adjustment to carry out either an edging or an edging and ripping operation on rough lumber throughout a wide range of board widths. Not only does the edger picker of the invention provide a plurality of saws which may be positioned in a selected spaced relationship for the edging of different widths of rough board selectively without adjustment but adjustments may be made quickly and accurately in a simple and easy manner to each pair of associated saws for other changes in the width of the boards to be edged. An outstanding feature of this invention is the novel picker construction whereby the pickers automatically follow the spacing adjustment made to each pair of associated edging saws and which maintains the pickers in a central position relative to their associated saws at all times to balance the edged board or boards and properly convey the boards to the delivery end of the edger picker. At the same time, the problem of disposing of the edgings without interference with the movement of the finished board is eliminated as the picker is of a relatively narrow width and regardless of the width of the board edged, the edgings drop downwardly by gravity along the sides of the picker. The narrow width of the picker not only permits the edgings to drop without fail regardless of the width of the boards being edged but also permits finished boards of relatively large widths to be balanced and conveyed as the picker is always centrally positioned between the side edges of the finished board regardless of the width of the board.

In the novel multiple saw arrangement of the edger section of the edger picker of the invention, the use of a single fixed saw positioned centrally between two movable saws enables an edging and ripping operation to be performed on boards of any width, adjustment for the edging operation being carried out quickly and easily as for a simply edging operation. At the same time, each movable saw and fixed saw may be utilized independently for a simple edging operation. Another outstanding feature of the invention is the arrangement of the two pickers each of which may not only separately function as a picker for an edging operation only but operate in the same manner to balance and properly convey both finished boards resulting from an edging and ripping operation with the edgings permitted to drop downwardly by gravity from the two finished boards in the same efficient manner. The versatility and outstanding performance of the edger picker of the invention by means of which lumber may be processed at a high rate by relatively unskilled labor is contributed to by its simplicity and minimum of working parts which make it inexpensive to produce and capable of prolonged use without breakdown.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. An edger picker for processing rough boards of the type cut from a log comprising, in combination, a frame, means on said frame for conveying boards in a path of travel, a fixed saw rotatably mounted on said frame, a movable saw mounted adjacent said fixed saw on said frame for rotation and for movement laterally of said frame, means for rotating said fixed and movable saws for edging a board conveyed in said path of travel, a rotatable control rod mounted on said frame, a pair of drive sprockets mounted on said control rod, a control arm pivotally mounted on said frame, means connecting said control arm to said movable saw, chain means for connecting one of said drive sprockets to said control arm, means for rotating said control rod to pivot said control arm through said sprocket and chain means for shifting said movable saw laterally of said frame to a selected position in laterally spaced relationship with said fixed saw, an elongated picker frame extending in the direction of said path of travel, means for supporting said picker frame at each end for movement laterally of said frame, conveying means supported on said picker frame, means on said picker frame for advancing said conveying means in the direction of said path of travel, said picker frame being centrally positioned relative to said fixed and movable saws for balancing and conveying an edged board from said saws in said path of travel, chain means for connecting the other drive sprocket on said control rod to both ends of said picker frame for shifting said picker frame simultaneouly with the shifting of said movable saw to maintain said picker in said central position relative to said saws in any selected position of said movable saw thereby permitting edging of boards of varying widths and gravity separation of edgings from the edged board conveyed in said path of travel by said picker frame conveying means.

2. An edger picker for processing rough boards of the type cut from a log comprising, in combination, a frame, means on said frame for conveying boards in a path of travel, a fixed saw rotatably mounted on said frame, a pair of movable saws mounted on said frame on opposite sides of said fixed saw for rotation and for movement laterally of the frame, means for rotating said fixed and movable saws for ripping and edging a board conveyed in said path of travel, a pair of laterally spaced rotatable control rods mounted on said frame, a pair of drive sprockets mounted on each of said control rods, a pair of laterally spaced control arms pivotally mounted on said frame, chain means for connecting one of said drive sprockets on each of said control rods to one of said control arms, means for connecting each of said control arms to one of said movable saws, means for rotating each of said control rods independently to pivot its associated control arm through its associated drive sprocket and said chain means for shifting its associated movable saw laterally of said frame to a selected position in laterally spaced relationship with said fixed saw, a pair of elongated picker frames extending in the direction of said path of travel, means for supporting said picker frames at each end in spaced parallel relationship for movement laterally of said frame, conveying means supported on each of said picker frames, means on each of said picker frames for advancing said conveying means in the direction of said path of travel, each of said picker frames being centrally positioned relative to said fixed saw and one of said movable saws for balancing and conveying an edge board from said saws in said path of travel, chain means for connecting the other drive sprocket on each of said control rods to one of said picker frames for shifting each of said picker frames simultaneously with the shifting of its associated movable saw to maintain said picker frame in said central position relative to said fixed saw and associated movable saw in any selected position of said associated movable saw thereby permitting ripping and edging of boards of varying widths and gravity separation of edgings from the edged board conveyed in said path of travel by said picker frame conveying means.

3. An edger picker for processing rough boards of the type cut from a log comprising, in combination, a frame including an infeed section, an edger section, and a picker section, a plurality of feed rolls rotatably supported on said edger section, means for rotating said feed rolls to convey boards in a path of travel, means on said edger section for urging a board against said feed rolls, a fixed saw rotatably mounted on said edger section, a pair of movable saws mounted on said edger section on opposite sides of said fixed saw for rotation and for movement laterally of said edger section, means for rotating said fixed and movable saws for ripping and edging a board conveyed in said path of travel, a pair of laterally spaced rotatable control rods mounted on said infeed section and edger section, a pair of drive sprockets mounted on each of said control rods, a pair of laterally spaced control arms pivotally monuted on said infeed section, chain means for connecting one of said drive sprockets on each of said control rods to one of said control arms, means for connecting each of said control arms to one of said movable saws, means for rotating each of said control rods independently to pivot its associated control arm through its associated drive sprocket and chain means for shifting its associated movable saw laterally of said edger section to a selected position in laterally spaced relationship with said fixed saw, a pair of elongated picker frames extending in the direction of said path of travel, a track at each end of said picker section extending laterally of said picker section, a pair of carriages on each of said picker frames engageable with said tracks for guidably supporting each end of said picker frames for movement laterally of said picker section, conveying means supported on each of said picker frames, means on each of said picker frames for advancing said conveying means in the direction of said path of travel, each of said picker frames being centrally positioned relative to said fixed saw and one of said movable saws for balancing and conveying an edged board from said saws in said path of travel, a longitudinally extending jack shaft on each side of said picker section, chain means for connecting the other drive sprocket on each of said control rods to one of said picker frames through one of said jack shafts for shifting each of said picker frames along said tracks simultaneously with the shifting of its associated movable saw to maintain said picker frame in said central position relative to said fixed saw and associated movable saw in any selected position of said associated movable saw thereby permitting ripping and edging of boards of varying widths and gravity separation of edgings from the edged boards conveyed in said path of travel by said picker frame conveying means.

4. An edger picker in accordance with claim 1 wherein said control rod rotating means includes a hand wheel secured to each of said control rods.

References Cited
UNITED STATES PATENTS

| | | |
|---|---|---|
| 2,672,896 | 3/1954 | Shortliff. |
| 3,017,909 | 1/1962 | Bowling. |
| 3,223,128 | 12/1965 | Stallings _____ 143—37 |
| 3,225,800 | 12/1965 | Pease _____ 143—37 |

WILLIAM W. DYER, Jr., *Primary Examiner.*

W. D. BRAY, *Assistant Examiner.*